B. K. HALL.
SHOCK ABSORBER.
APPLICATION FILED JULY 7, 1914.
1,148,312.
Patented July 27, 1915.
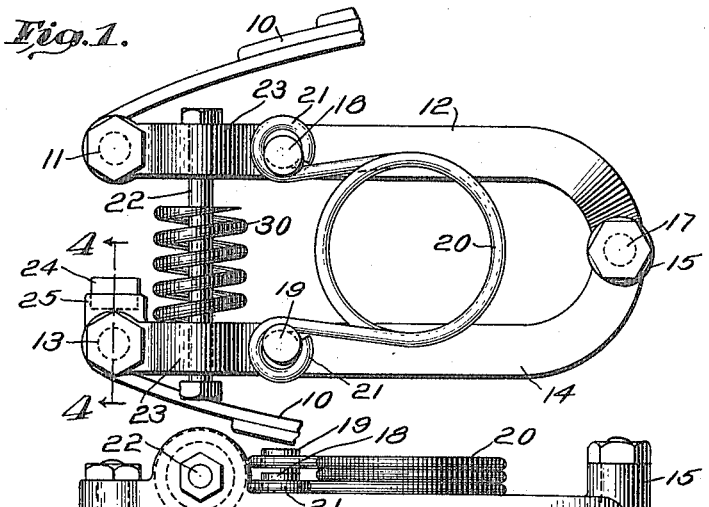
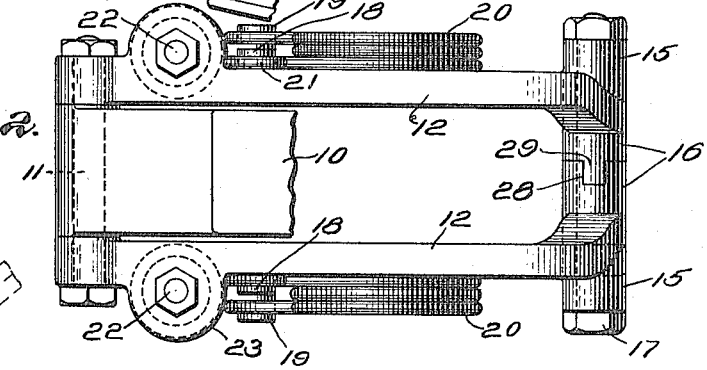
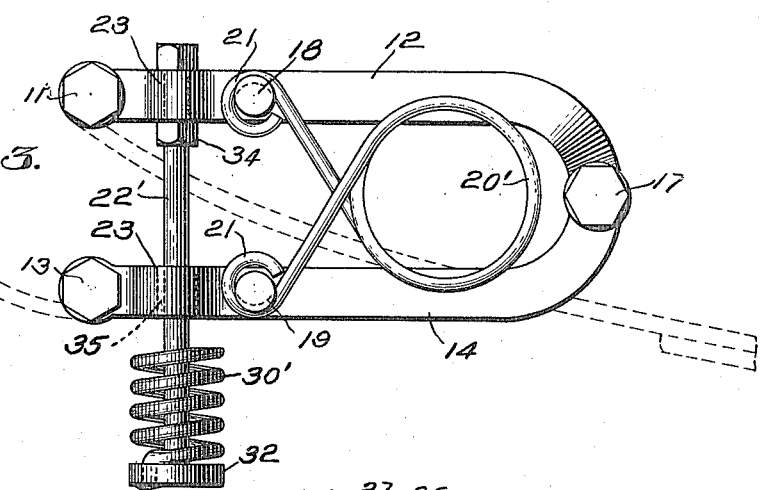
Witnesses,
William J. Maney.
Mary C. Smith.
Inventor;
Benjamin K. Hall,
by Roswell F. Hatch
atty.

UNITED STATES PATENT OFFICE.

BENJAMIN KIMBALL HALL, OF BOSTON, MASSACHUSETTS, ASSIGNOR TO KIM MANUFACTURING COMPANY, OF MERRIMAC, MASSACHUSETTS, A CORPORATION OF MASSACHUSETTS.

SHOCK-ABSORBER.

1,148,312.     Specification of Letters Patent.    Patented July 27, 1915.

Application filed July 7, 1914. Serial No. 849,397.

*To all whom it may concern:*

Be it known that I, BENJAMIN K. HALL, of Boston, in the county of Suffolk, Commonwealth of Massachusetts, have invented certain new and useful Improvements in Shock-Absorbers, of which the following is a specification.

This invention relates to shock absorbers adapted for use on motor vehicles.

The object of the invention is to provide a shock absorber which possesses good riding qualities, is cheap to manufacture, easily adjusted to various makes of automobiles, and which will not disable the car in case the spring or other resilient member becomes broken. These objects and such others as may hereinafter appear will best be understood from the following description taken in connection with the accompanying drawings, in which:—

Figure 1 is a side elevation of the invention as constructed for use on a car in which the load tends to force the ends of the usual springs together. Fig. 2 is a plan view of the parts shown in Fig. 1. Fig. 3 is a side elevation of the invention as constructed for use on a car in which the load tends to separate the ends of the usual springs: and Fig. 4 is a section on the line 4—4 of Fig. 1.

In the drawings, 10 indicates the usual upper and lower leaf spring of an automobile which are most commonly fastened either directly together or connected through some intermediate device. In the present embodiment of the invention, the end of the upper spring 10 is pivotally connected by means of a bolt 11 with a pair of arms 12, one arm being on each side of the spring. The end of the lower spring 10 is connected by a bolt 13 with a second pair of arms 14 which are preferably in the same vertical plane as the arms 12. The opposite ends of the arms 14 are provided with hubs 15 and the arms 12 have hubs 16.

The arms are all pivoted on a bolt 17 which passes through the hubs. The arms 12 are offset as shown in Fig. 2 in order that the greater part of these arms may occupy the same vertical plane as the arms 14. Each of the arms 12 is provided with a short laterally extending boss 18 and each of the arms 14 is provided with a longer boss 19. A helical spring 20 has its ends extended and bent up to form eyes 21 which engage the bosses 18 and 19 and tend to keep the two arms separated at their free ends. By providing supporting means such as the bosses 18 and 19, one in each of the vertical planes of the end turns of the spring 20, it is possible to use a spring of this character in which there is no offset in the extended ends. This greatly increases the strength of the device, as the first place to break in a torsional spring having an offset end is in the offset portion.

In order that excessive rebound may be prevented a bolt 22 connects the arms 12 and 14 on each side of the leaf spring 10. The bolt passes through a hole in a lug 23 on each arm so that the expansive movement of the spring 20 is limited by the head and nut on the bolt.

It is impossible to avoid an occasional breakage of the springs 20 owing to defects in material. In case one or both of these springs should break, a bumper is provided to carry the load, under the usual leaf springs, without noise or jar and without interfering with the normal operation of the springs. The free ends of the arms 14 are slightly enlarged to form a suitable bearing for the bolt 13. The top of the hub on the end of each arm is provided with means for holding a piece of soft rubber or other yielding material 24. This holding means may consist of a projection 25 having a pocket 26 to receive the tapered end of the rubber 24 formed with a beveled face 27. When the arms 14 are drawn together by the bolt 13 the bumper is held securely in place.

The construction described provides a shock absorber having a torsional helical spring which is subject to no abnormal strains, means to limit the rebound, and a bumper for use in case of breakage of the spring or in case of extreme overload. This device is sufficient and satisfactory for light cars such as runabouts.

There is considerable variation in the width of the leaf springs in different makes of cars. In order that the arms of each side of the leaf spring may fit as closely thereto as possible, it is desirable that the distance between the arms shall be capable of adjustment although it is evident that the two arms 12 and their hubs might be cast all in one piece for any single make of car. The distance between the arms 12 is adjusted when assembling the device by grinding off the abutting ends of the hubs 16. Provision is made for locking these arms against relative angular movement by providing a slot 28 in one hub and a coacting tongue 29 on the other. It is evident that the tongue and slot will not prevent grinding off the hubs to adjust the distance between the arms.

When this invention is used on heavy cars or trucks it is desirable that auxiliary shock resisting means be employed. For this purpose a helical compression spring 30 surrounds each of the bolts 22, the normal length of the spring being such as to permit the springs 20 to act for a short distance before both of the arms 12 and 14 engage the spring 30 and this spring starts to act.

On cars in which the load tends to separate the ends of the usual leaf springs, the construction hereinbefore described is modified as shown in Fig. 3. In this instance the ends of the springs 20' are crossed so that the opening movement of the arms will tighten the coils of the spring. The bolts 22' are extended below the arm 14 and provided with enlarged heads 32 which form seats for the auxiliary spring 30'. These springs may be secured to the heads 32 by passing the end of the spring through a hole in the head and riveting the end as indicated at 33. In order to prevent rattling the bolts 22' are fixed in the arm 12 by a locknut 34 in which case the hole 35 in the lower lug 23 is enlarged to provide greater clearance. Some form of locknut may be employed on all the bolts if desired.

The operation of both the illustrated forms of the invention will be apparent from an inspection of the drawings. It is obvious that while the invention is illustrated and described as being used between two springs of a pair, it may equally well be attached where but one leaf spring and a fixed support, such as the axle of the car, are used.

It is to be understood that the invention is not limited to the exact details of construction herein set forth, but that the construction and arrangement of parts may be varied by a skilled mechanic, as, for example, by employing compressed air devices in place of certain springs, without departing from the spirit of the invention as defined in the claims.

Having described the best form of the invention at present known to the inventor, what is claimed as new, is:

1. A shock absorber comprising a pair of arms pivotally connected together at one end and adapted to be attached at their opposite end to two members of a vehicle; a spring interposed between said arms; a bolt to limit the movement of said arms in one direction under the influence of said spring; and auxiliary means for increasing the resistance of the arms to a movement thereof in an opposite direction after a predetermined movement against the action of said spring.

2. A shock absorber comprising a pair of arms pivotally connected together at one end and adapted to be attached at their opposite ends to two members of a vehicle; a spring interposed between said arms; a bolt to limit the opening movement of said arms under the influence of said spring; and auxiliary means for increasing the resistance of the arms to a closing movement against the action of said spring.

3. A shock absorber comprising a pair of arms, a second pair of arms in substantially the same vertical plane as the respective arms of the first pair, a common pivot for said arms, a spring interposed between each vertically alined pair of arms, a bolt to limit the opening movement of the arms under the influence of said spring, and auxiliary means for increasing the resistance of the arms to a closing movement after a predetermined closing movement against the action of the spring.

4. A shock absorber comprising a pair of arms constructed to be pivotally connected with a member of a vehicle, a second pair of arms constructed to be pivotally connected with a member movable relatively to the first member, a common pivot for all of said arms, a spring interposed between the two pair of arms, a hub having a tongue on one of said arms, and a hub on the other arm of the pair having a coacting slot.

In testimony whereof, I have affixed my signature, in the presence of two witnesses.

BENJAMIN KIMBALL HALL.

Witnesses:
 WILLIAM J. MANEY,
 WALTER E. LOMBARD.

Copies of this patent may be obtained for five cents each, by addressing the "Commissioner of Patents, Washington, D. C."